United States Patent [19]
Carmein

[11] Patent Number: 5,562,572
[45] Date of Patent: Oct. 8, 1996

[54] OMNI-DIRECTIONAL TREADMILL

[76] Inventor: David E. E. Carmein, 4921 Upton Ave. South, Minneapolis, Minn. 55410

[21] Appl. No.: 401,550

[22] Filed: Mar. 10, 1995

[51] Int. Cl.$^6$ ..................................................... A63B 24/00
[52] U.S. Cl. ............................ 482/4; 482/54; 482/902; 434/247; 198/779
[58] Field of Search .............................. 482/1–9, 71, 72, 482/52, 54, 55, 57, 900–903; 434/247; 73/379.01; 395/152, 154; 364/410; 273/438; 198/370.01–370.03, 371.01–371.03, 779, 840; 345/106

[56] References Cited

U.S. PATENT DOCUMENTS

| | | | |
|---|---|---|---|
| 3,451,526 | 6/1969 | Fernandez | 198/370.03 |
| 3,550,756 | 12/1970 | Kornylak | 198/779 X |
| 4,906,192 | 3/1990 | Smithard et al. . | |
| 4,934,694 | 6/1990 | McIntosh . | |
| 5,054,771 | 10/1991 | Mansfield . | |
| 5,071,352 | 12/1991 | Denne . | |
| 5,076,584 | 12/1991 | Openiano . | |
| 5,186,270 | 2/1993 | West | 180/6.62 |
| 5,229,756 | 7/1993 | Kosugi et al. | 345/106 |
| 5,238,099 | 8/1993 | Schroeder et al. | 198/779 X |
| 5,240,417 | 8/1993 | Smithson et al. . | |
| 5,385,519 | 1/1995 | Hsu et al. . | |
| 5,490,784 | 2/1996 | Carmein | 434/307 R X |
| 5,495,576 | 2/1996 | Ritchey | 395/154 X |

OTHER PUBLICATIONS

"Virtual Environment Display System" by Fisher et al, ACM 1986 Workshop on Interactive 3D Graphics, Oct. 23–24, 1986, pp. 1–11.

Millman, P. et al., "A System for the Implementation and Kinesthetic Display of Virtual Environments", SPIE Proc., vol. 1833, 1992.

McNeely, W. A., "Robotic Graphics: A New Approach to Force Feedback for Virtual Reality", IEEE Virtual Reality Annual Symposium, pp. 336–341, Seattle,–Washington, Sep. 1993.

Sheridan, T. B. et al, "Virtual Reality Check", Technology Review, vol. 96, No. 7, Oct., 1993, pp. 21–28.

*Primary Examiner*—Joe Cheng
*Attorney, Agent, or Firm*—Burd, Bartz & Gutenkauf

[57] ABSTRACT

A treadmill having a track assembly that allows a user to walk or run in any arbitrary direction. A movable user support has a plurality of rotatable members that rotate about axes normal to the direction of movement of the user support. Separate power driven mechanisms concurrently move the user support and rotate the members to omni-directional user movement.

A control for the power driven mechanisms is responsive to the directional orientation of the user on the user support to cause the user support to operate in the direction of the orientation of the user.

20 Claims, 10 Drawing Sheets

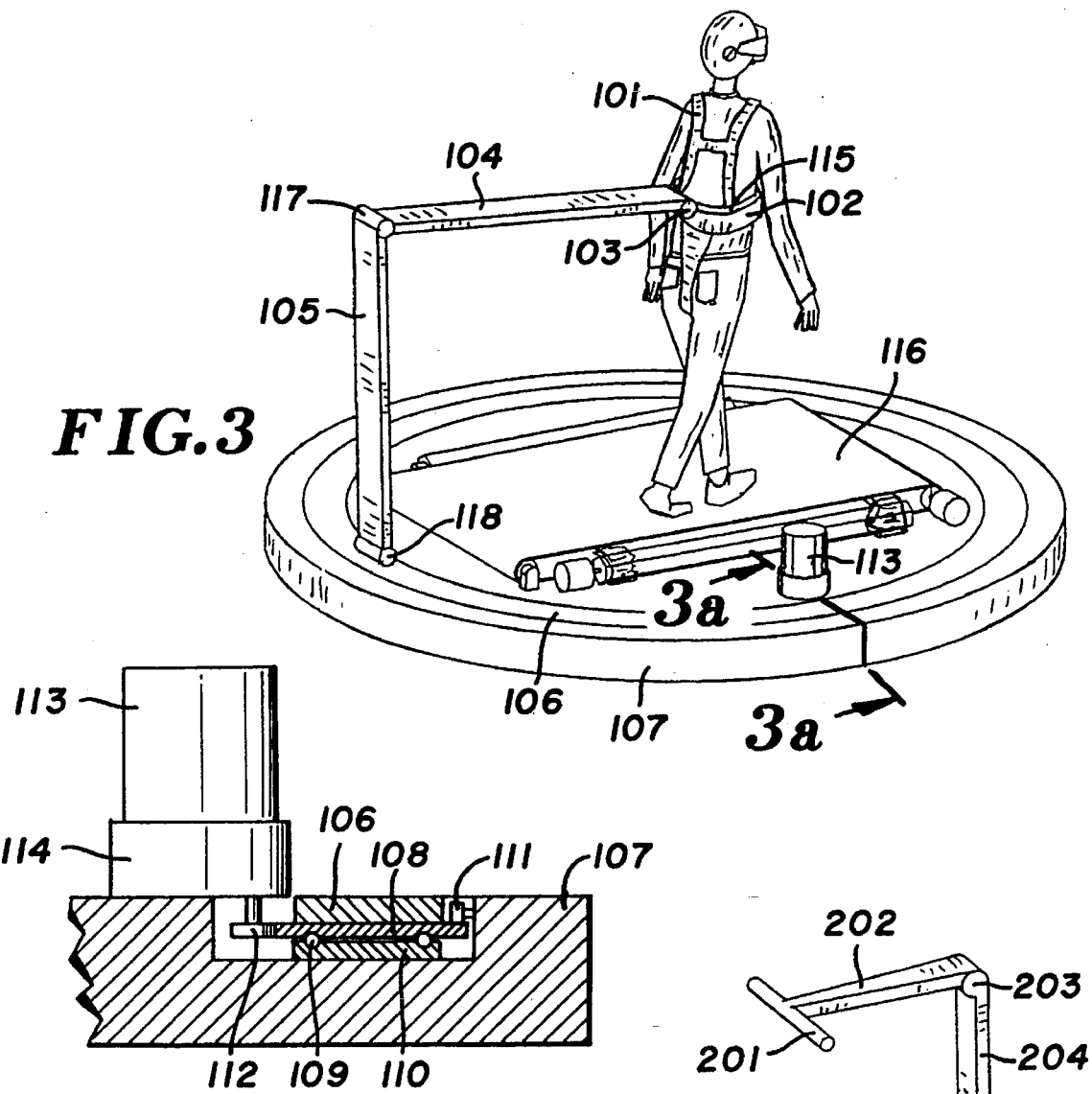
FIG.3
FIG.3a
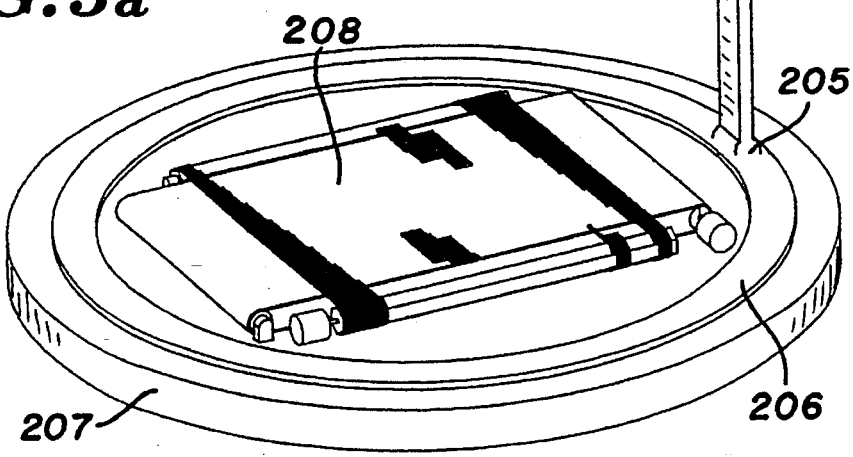
FIG.4

{5,562,572}

OMNI-DIRECTIONAL TREADMILL

FIELD OF THE INVENTION

The invention is in the field of human rehabilitation, training and exercise equipment and methods that permit the user of the equipment to walk or run in any arbitrary direction and employs haptic sensing with balance to imbue a sense of reality to the simulated environment.

BACKGROUND OF THE INVENTION

Virtual Reality (VR) typically employs computer-generated stimulation of the human sensorium to simulate naturally occurring inputs such as sight and sound. Additional senses which may be stimulated include orientation, balance, and touch and force (haptic) feedback. A complete and immersive VR experience might simultaneously stimulate a user with sight, sound, touch, and movement.

A major limitation in state-of-the-art VR is the inability to permit simple walking and running. Navigation is typically experienced as a disembodied center of consciousness which is directed by pointing, other gesture or by manipulation of a joystick, trackball, mouse, or similar device. The actual physical sensation of walking is limited to one of two forms: a) The user is restricted to a confined and immobile surface where tracking and signal generation are well-controlled, and b) the user is confined to device such as a linear treadmill or wheelchair which transduces the user's linear motion to virtual space navigation. The conventional linear treadmill has a movable track which can be upwardly inclined. The track is only movable in one direction which restricts motion of the user to the direction of movement of the track. A monitor, such as a motivational electric display, associated with the track records the time, speed, and distance accomplished by the user.

Use of a linear treadmill, consisting of one continuous moving track, in conjunction with a monitor permits a user to walk in a straight line. The user cannot step in arbitrary directions as s/he would be able to in real life. This limitation in directionality detracts from the immersive nature of the experience, and requires that the experience take on more of a vehicular nature rather than freely walking and navigating body.

SUMMARY OF THE INVENTION

The invention described herein is most similar to a linear treadmill in that the user is able to walk or run in an upright manner and employ proprioceptive sensing along with balance to imbue a sense of reality to the simulated environment. Alternatively, the user may assume any of the manner of postures with respect to the planar active surface. Other postures including kneeling, crawling on hands and knees, belly crawling, and sitting and lying prone.

The invention is an omni-directional treadmill apparatus that allows a user, such as a person, to walk or run in any arbitrary direction. The apparatus has a frame for supporting the apparatus on a fixed surface. A track assembly mounted on the frame provides a user support that moves in a direction determined by directional orientation of the user on the track assembly. The track assembly has a user support movable in first direction by a first drive motor. The user support means includes user support members rotatable about axes generally normal to the direction of movement of the support. A second drive, such as a power driven endless belt, engages the user support members to rotate the user support members whereby the combined movement of the user support members and user supports results in omni-directional user movement. Controls responsive to the directional orientation of the user on the user support selectively control the operation of the first and second drives which in turn controls the directional user movement to conform with the orientation of the user on the user support.

DESCRIPTION OF THE DRAWING

FIG. 3 is a perspective view of a first modification of the treadmill of the invention;

FIG. 3a is an enlarged sectional view taken along line 3a—3a of FIG. 3;

FIG. 4 is a perspective view of a second modification of the treadmill of the invention;

DETAILED DESCRIPTION

Figure 1:
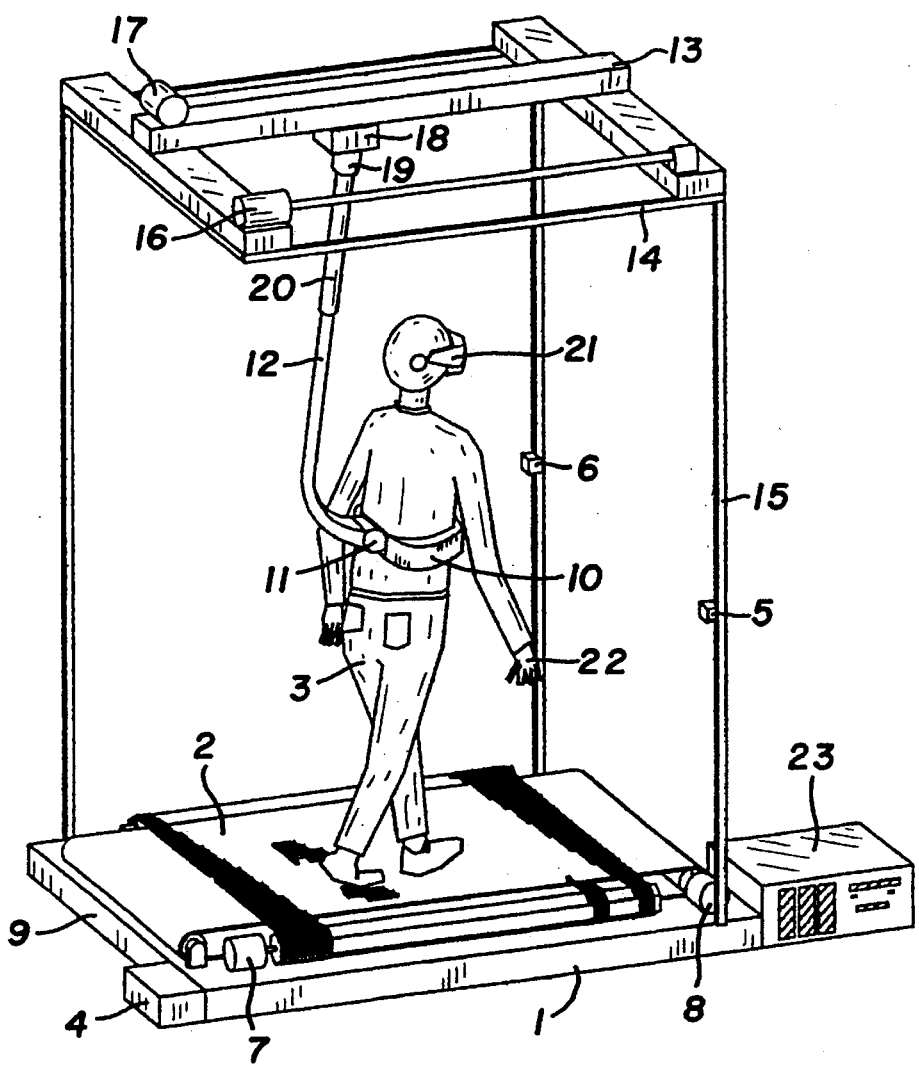
FIG. 1 is a perspective view of the omni-directional treadmill of the invention.

The invention avoids the limitations of a traditional treadmill by permitting a user to walk in any arbitrary direction. FIG. 1 depicts an Omni-Directional Treadmill (ODT)[1] with an active surface [2] which cleverly employs a unique mechanism by which a user [3] positioned at any location on the active surface may be transported to any other point on that surface. More typically, a user who is headed off the active surface is moved back toward the center of the surface analogous to the way a linear treadmill prevents a user from running off the front or being flung off the back. Integral to the ODT is a closed-loop motor control mechanism [4] and a user position-sensing device [5, 6] which pinpoints the position of the user with respect to the fixed axes of the treadmill's active surface. These two work in concert with X axis control motor [7] and Y axis control motor [8] to ensure proper positioning of the user on the active surface, which is fixedly attached at selected points to a rigid base [9]. In the embodiment of FIG. 1, tile position sensors are ultrasonic transducers of a design well known to those skilled in the art of ultrasonic position sensing.

To address the problem of balance, the ODT optionally includes a means for steadying the user. A structure as simple as a circular railing may suffice. More preferable from tile standpoint of transparency is the use of a balance cuff [10] which attaches near the user's center of balance. A hinge [11] at the small of the user's back connects the cuff to a support strut [12] which serves to link the user with the X–Y tracking mechanism [13] of the support frame [14]. Under normal circumstances, the cuff permits active X–Y tracking of the user because the support strut [12] actively maintains a vertical position. In this fashion, the user barely knows the cuff is there. When the user becomes unstable, however, the cuff serves to assist in regaining balance.

In order for the cuff and strut support to actively track the user in any orientation, the strut is preferably connected to a support structure [14] directly over the user's head which is supported by at least three vertical support members [15]. Two motors [16, 17] actuate tile X–Y tracking means respectively to maintain the support strut [12] in a vertical position with respect to the user. Motors are controlled by sensing the variance of the support strut from the vertical. A pair of X and Y potentiometers [18] sense the angular error of the support strut in the XZ plane and YZ plane respectively. An XZ error, for example, indicates that the X motor [16] must drive the mechanism in the direction to reduce the error to zero. Likewise for an error in the YZ plane controlling the Y motor [17]. Rotations about Z caused by the user turning are passed through a slip-ring assembly [19]. Said slip-ring assembly prevents a winding or twisting of the support strut, and also permits passage of electrical power and signals through rotary electrical contacts so that connection may be maintained with the equipment worn by the user. Slip-ring assemblies are readily known to those familiar with rotary electrical contacts. In a similar fashion, the vertical motion of the user is permitted by an extension mechanism [20]. Said extension mechanism allows only linear motion, and permits passage of electrical signals to and from the user.

The preferred embodiment of the device is a combined ODT/VR system as revealed in FIG 1. It allows close coupling of the user's physical direction and velocity with that of the virtual world in which the user is navigating. Such a system might typically include a head-mounted display (HMD) [21] with speakers and microphone, data glove(s) [22], a body sensing suit (not shown), exoskeletal joint angle sensors, and/or other related apparatus. Said VR system would likely include a computer [23] for image generation, sound generation, and processing of related data such as head and hand position. Though not explicitly shown, peripherals worn by the user are hard-wire connected to the computer system through wires running up the support strut [12], through the X–Y tracking support [13], and down the support frame vertical member [15].

The ODT works in synchrony with the VR system by sending velocity and direction signals to the image generation computer. The computer uses the velocity vector thus provided to update the image which is shown to the user so that the user sees a visual image which takes into account this vector. For example, if the user's velocity is ½ meter/sec in the X direction as indicated by the X direction motion of the treadmill, the user will observe objects within the virtual world passing by at ½ meter/sec in the minus X direction.

Variations of the combined ODT/VR system include the ability to tip the platform to simulate uphill travel, and networked VR experiences in which one user shares a virtual world with others.

Figure 2:
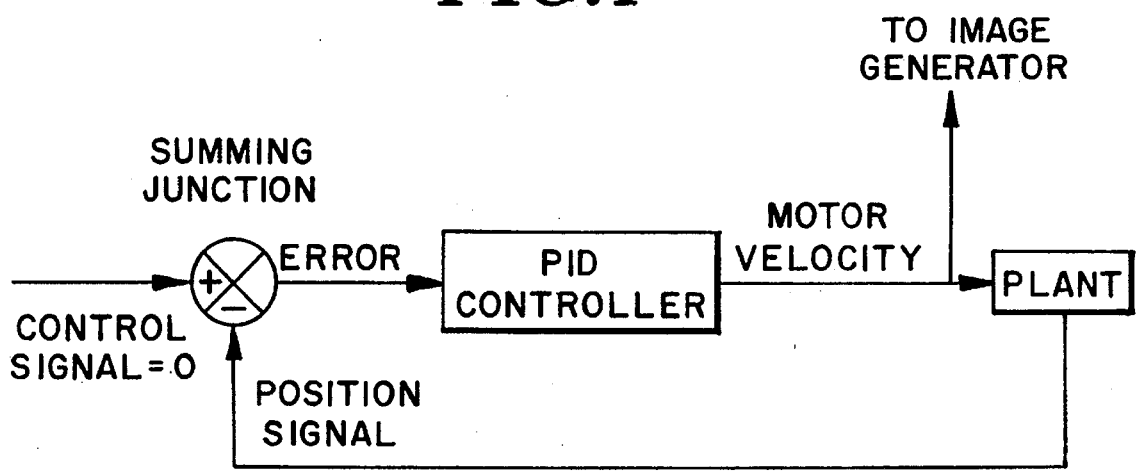
FIG. 2 is a block diagram of the motor control of the treadmill.

Additional variations to the ODT/VR system include integration of sensing and stimulation systems. Examples of additional sensing might optionally include full or partial human surface mapping, video capture, or their combination, which can then be manipulated and transported as the user's virtual image. A companion traveller in virtual space would then see a real-time facsimile of the user. FIG 2 is a block diagram for the control of a single motor. This motor and its affiliated control loop may actuate either the X or Y axis control for either the active surface or the support cuff tracker.

With reference to FIG. 2, for a single axis of the active surface, the Control Signal is set for zero at the center of the surface. If the Position Signal is off-center, the Summing Junction generates an Error signal which is proportional to the error. A PID (proportional-integral-differential) Controller, which is well known and well characterized to those familiar with the art of motion control, is tuned to interpret the error signal over time, outputting a signal which controls motor velocity along one axis. Motor velocity and its associated direction are interpreted by the VR system as a velocity and a direction, and the image presented to the user is updated accordingly. Motor velocity also causes the active surface to be driven in a direction which reduces the Error. The Plant represents the system components, including the user, which are responsible for generating a position signal. In this case, the Plant includes the active surface as it is driven back toward center, the user, who is being driven back toward center by the motion of the surface, and the ultrasonic transducers, which sense the absolute position of the user with respect to the zero reference position, and generate the Position Signal which may be resolved by the Summing Junction.

Control of a support cuff tracking motor occurs in a similar fashion. With reference to FIG. 2, the Control Signal is set for zero when the support strut is vertical with respect to its active axis. If the Position Signal shows an angle other than zero, an Error signal is generated which is proportional to the angular error. The PID controller outputs a signal for the motor controlling the axis of interest, which turns at the specified velocity. The Motor Velocity drives the mechanism of the Plant in the direction to reduce the error to zero, and the next cycle is begun again. In the device of FIG. 1, the position signal might be generated by a rotary potentiometer [17] which is affiliated with the axis of interest.

An alternative embodiment of the cuff support is shown in FIG. 3. The user [101] is shown wearing a harness [102] rather than a cuff [10] of the type shown in FIG. 1. In this case the harness is flexibly connected through a hinge [103] to a rigid horizontal member [104]. Said member is hingedly connected to a vertical member [105], which is hingedly connected to a rotating fixture ring [106]. Said ring is rotatably held within the base [107]. In the section view we see that the fixture ring is fastened to a gear ring [108] which rests on a dual bearing race [109] supported by a bearing ring [110]. The gear ring is restrained from transverse movement by the bearing race grooves, and is constrained in the upward direction by roller contacts [111]. Said ring is driven about its center by geared contact with a spur gear [112], said gear driven by the drive motor [113] through a gear reduction means [114].

Shear sensors within the cuff [115] or at the hinge [103] generate a signal which is analogous to the Error signal of FIG. 2. The motor [113] drives the ring in a direction to reduce the shear sensor output toward zero. In this manner the cuff and support struts track the user's position, providing support and balancing assist to the user along with a hard-wired connection to the HMD and sound system. In all other respects, the active surface [116] of the ODT behaves the same as that in FIG. 1. For clarity, the position sensors, motor drivers, and computers are omitted from the figure.

Even better support may be provided to the user by making the hinge support [117] of the horizontal member [104] and the hinge support [118] of the vertical member active members, i.e., they can be actively damped. Active damping would sense the rate at which the user is moving, and would increase damping in proportion to the velocity of movement. In this way, if the user should fall or loose balance, the rapid change in velocity would cause much increased damping at the hinges, and would provide the support needed to regain balance.

A non-motorized version of the embodiment of FIG. 3 would employ a hand grip for steadying balance, as shown in FIG 4, rather than the actively tracking cuff of FIGS. 1 & 3. The hand grip [201] attaches through a horizontal member [202] through a hinge [203] to a vertical member [204]. The vertical member is attached through a hinge [205] to a ring [206] of the type depicted in FIG. 3 which is rotatably attached to the base [207]. Because the ring rotates around the user (not shown) under power of the user, there is no motor. The user would always have at least one hand on the hand grip, and would apply forward and backward force, and torque to the handle to properly position it as they moved about the active surface [208]. This embodiment of the invention, though reduced in features, would be lower cost to manufacture and would require less ceiling height. The unit could be comfortably installed in the home or office with no special height or power requirements. For clarity, the user, position sensors and computers are omitted from the figure.

Figure 5A:
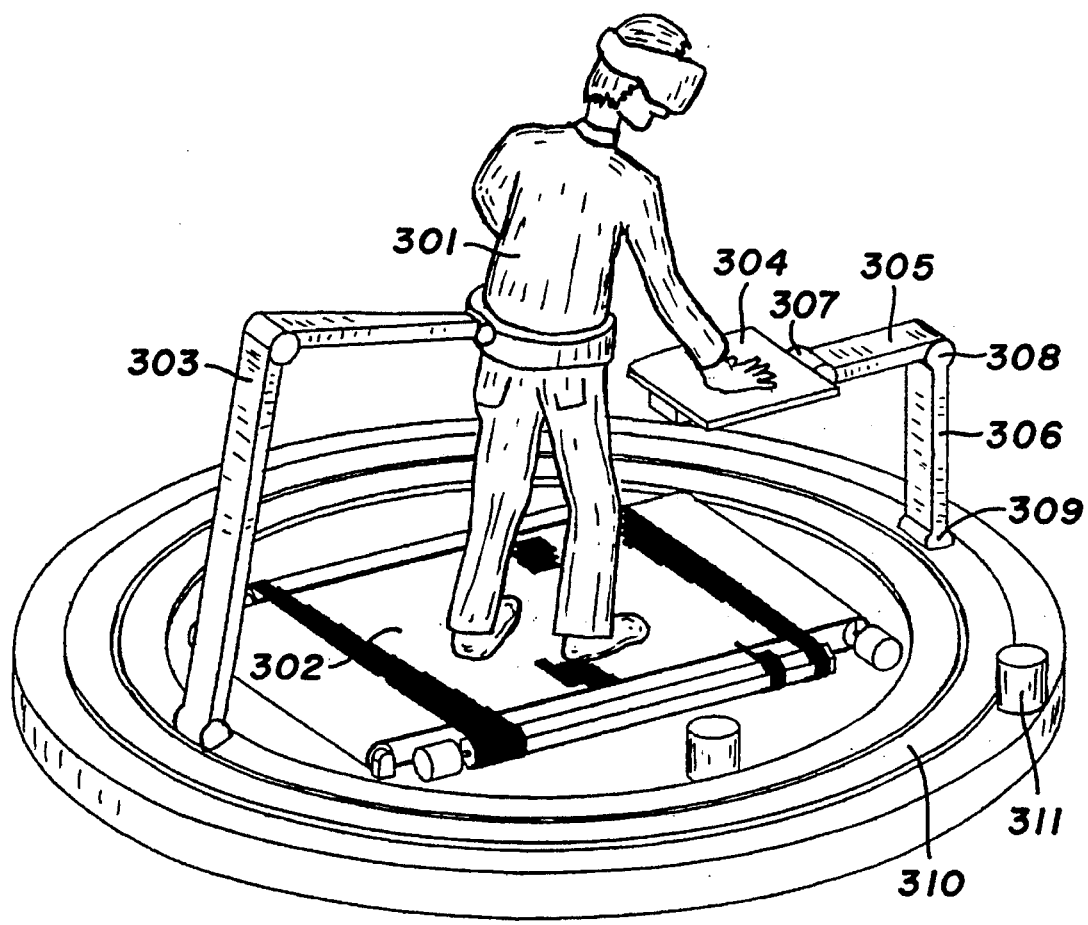
FIG. 5a is a perspective view of a third modification of the treadmill of the invention.

Haptic interaction may be accomplished through use of active or dynamic "interactive solids" also referred to generally as "haptic displays." FIGS. 4a and 4b show how such haptic displays might interact with the user. FIG. 5a depicts a user in real space. Here we see the user [301] standing on the ODT [302], supported as before by a cuff and strut assembly [303]. The User is reaching out and touching a flat, horizontal surface [304] upon which he is about to sit. Said surface is controllably placed by a motorized strut assembly consisting of a horizontal member [305], a vertical member [306], and hinge control motors [307, 308, 309]. This positioning assembly is fixedly mounted on a secondary mounting ring [310] of the type first shown in FIG. 3. Said ring is powered and positioned by a motor [311] in a fashion similar to that of the motor depicted in FIG. 3. The surface [304] may be controllably placed by suitable rotation of the ring [310], and turning of the hinge motors [307–309].

Figure 5B:
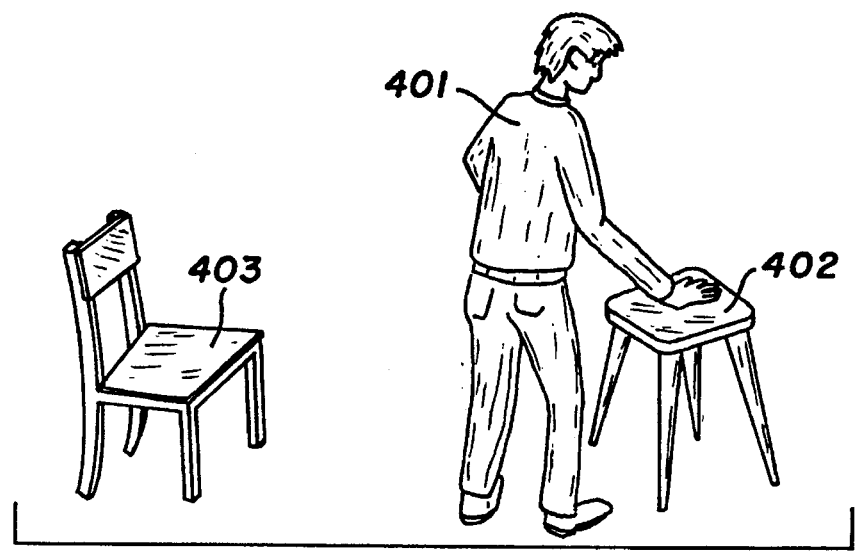
FIG. 5b is a diagrammatic view showing the user in real space.

FIG. 5b depicts visual reality as seen by the user of FIG. 4a. In the virtual space of FIG. 4b, the user [401] sees and physically interacts with the surface of FIG. 4a where it appears as a chair [402]. This is an example of a dynamic interactive solid because it may dynamically interact with the user to solidify the synthetic visual reality. A second chair [403] which is within the user's virtual world is also available to sit upon. If the user were to choose the second, lower chair, he would simply turn and walk to that chair. The ring [310] of FIG. 4a will swing the interactive solid [304] to correspond with the anticipated surface of the second chair, and the user may touch it and sit upon it.

In a similar fashion, a solid may be fixedly placed on the immobile base of the ODT. This example of a passive interactive solid performs the same function as a dynamic interactive solid, but has no ability to move or react to the user or the virtual environment. The image which corresponds to said passive solid is fixed in the reference space of both the real world and the virtual world. An example of said passive solid might be a desktop.

Passive and dynamic solids are not restricted to the circular-ring embodiments of FIG. 3–5. They may just as easily be implemented within the embodiment of FIG. 1 and its related variations. An example of such a hybrid system would include above-mounted cuff support, such as shown in FIG. 1, as well as single or multiple rings for positioning and securing passive and dynamic interactive solids.

The invention is not restricted to the use of a balance cuff. ODT's with larger surface areas and gentle centering action may not need a cuff to support and balance a user. A large active surface area allows restorative forces to be gentle enough to avoid upsetting the user's balance.

Interactive solids are referred to in the literature as "haptic displays" (1) or "roboxels" (2). Related work has evolved interactive surfaces such as circular plates and shafts with torque feedback (Good, U.S. Pat. No. 5,185,561). Exoskeletal devices, such as those developed by Exos, Inc.(3) and by Tachi in Japan (4), permit force feedback from shapes of arbitrary geometry. It is in the spirit of the invention to optionally include both passive and dynamic interactive, reality-enhancing means as integral to the function of the ODT.

USES

By Itself, the ODT is Useful as:
1. An exercise device
2. A motion analysis device for movement in arbitrary directions
3. A training device for lateral moves in arbitrary directions Combined with a VR system, the ODT is useful for:
1. Exercise
2. Motion analysis
3. Training
4. Recreation
5. Virtual space navigation
6. Telepresence
7. Education
8. Psychological analysis and therapy

DETALED DESCRIPTION

Basic Mechanism

In order for an active surface to move a resting mass in any direction it must have available two active vector motion components, plus and minus X, and plus and minus Y. A linear treadmill has only ±X. The ODT has both.

The ODT employs a "vector thrust drive" which mechanically separates the two motion components so that they can be powered and controlled by two separate motors. The vector thrust is the vector sum of the X motion component and the Y motion component.

Figure 6:
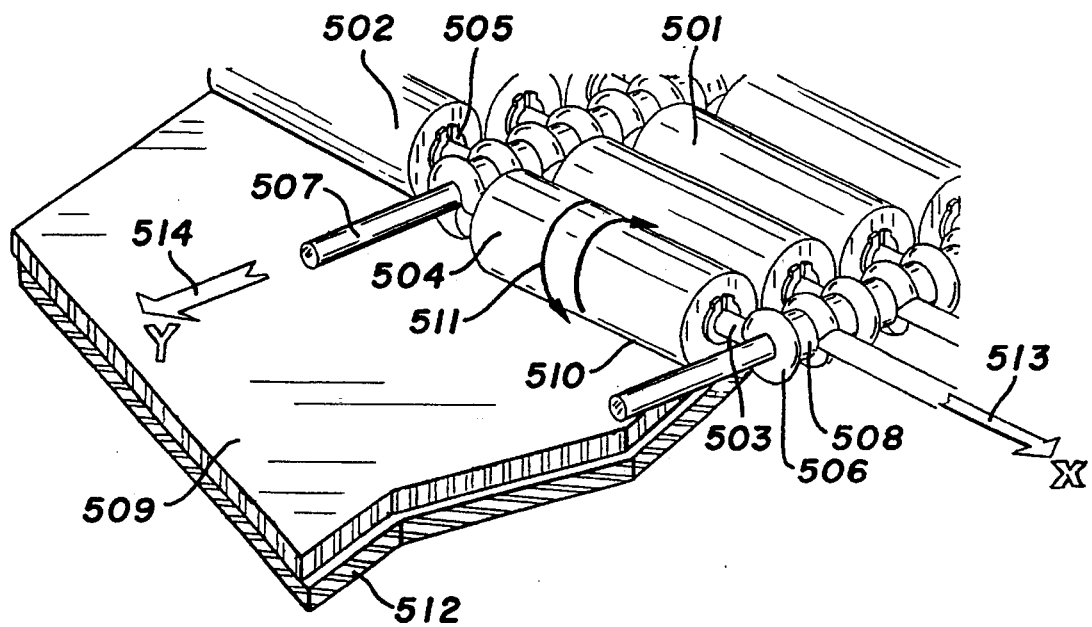
FIG. 6 is a perspective view of a section of the track assembly employed in the treadmills of FIGS. 1 to 5.

As shown in FIG. 6, the active surface [501] of the ODT, hereinafter referred to as the roller belt, is comprised of a multiplicity of identical roller segments [502]. A roller segment consists of a rigid shaft [503] upon which is mounted a freely rotating roller [504] which is kept within its lateral boundaries by spring clips [505] fastened at the ends of the shaft. Ends of the shaft are formed into eye hooks [506], which, in turn, are held around a common hinge axis by a hinge rod [507]. Contact points of individual eye hooks are separated by spacers [508] to properly position them and to prevent lateral motion. Each roller frictionally abuts a surface [509], preferably a flexible belt, moving at right angles to the motion of the roller segments, along a line of contact [510] which ,serves to create selective rotational motion [511] to the roller. The flexible belt is supportively abutted by a rigid support plate [512] which substantially takes the load of the user's weight, and ensures that the active surface remains flat.

X-direction motion [513] of the roller belt [501] is driven by the X-direction motor of FIG. 1 [7, FIG. 1]. Y-direction motion [514] of the flexible belt [509] is driven by the Y-direction motor [8, FIG. 1].

Figure 7:
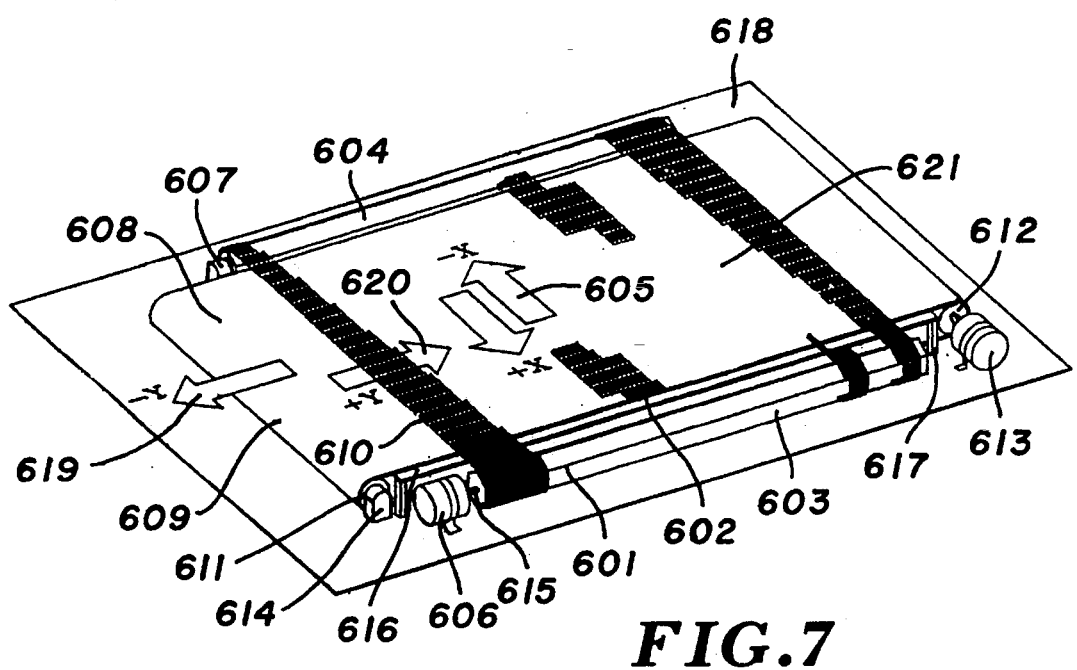
FIG. 7 is a perspective view of the track assembly employed in the treadmills of FIGS. 1 to 5.

FIG. 7 shows the complete mechanism for achieving full omni-directional motion, and shows that the hinge rod [601] permits the roller belt [602] to flex around rollers [603,604] at the belt edges. Hex rollers actuate the roller belt in the ±X vector direction [605]. As shown, rollers are hexagonal in shape to accommodate the hinged nature of the roller belt.

In the embodiment of FIG. 7, one hex roller is powered by a motor [606] while the other is an idler [607], although both rollers could easily be powered. The linearly actuated planar surface [608], which is the top surface of a flat, closed-loop drive belt [609] is placed in intimate contact with the bottom surface of the roller belt [610], and oriented so that its motion is at right angles to the motion of the roller belt. It is supported and directed at its ends by rollers [611,612]. In the preferred embodiment, only one roller is actuated by a motor [613]; the other is an idler roller.

Rollers are supported by bearings [614], or by a motor drive shaft [615]. The bottom surface of the flat, flexible drive belt [609] is supportively abutted by a rigid support plate [616] which is supported at each of its four corners by support legs [617]. Said support legs, bearings, and motors are securely fastened to a rigid support surface [618] which serves as ground.

When the roller belt alone is actuated, the top of the rollers provide ±X motion. When the flat belt alone is actuated, it frictionally contacts the bottom surface of the rollers, thus causing them to rotate about their free axis. So, if the belt is moving in the −Y direction [619], the top surface of the rollers is moving in the +Y direction [620]. Since the contact lines at the top of each roller are moving in concert, a mass resting on the active surface [621] defined by the sum of the contact lines is moved in the direction of the combined X and Y motion vectors. The active surface of this figure [621] may be identified with the active surfaces of FIG. 1, FIG. 3, and FIG. 4.

Figure 8:
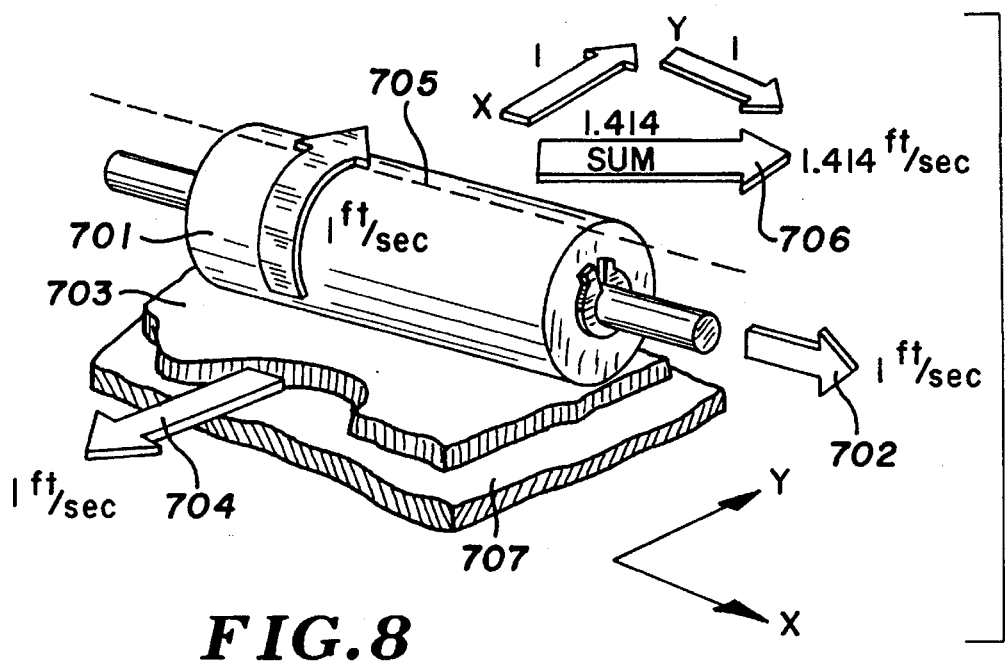
FIG. 8 is a diagrammatic perspective view similar to FIG. 6 showing the movement of the rotatable sleeves and sleeve drive belt.

By actuating the beaded belt and the flat belt simultaneously, the surface contact lines of the rollers may be made to impart any combination of X and Y movement. For instance, in FIG. 8 we see a roller segment [701] moving at plus 1foot/second in the X direction [702], and the flat belt [703] is moving at minus 1ft/second in the minus Y direction [704]. The freely-rotating roller converts the belt's −Y motion to a +Y motion at the contact line [705]. And the combined thrust vector [706] equals the vector sum of the two belt's motions, i.e., 1.414 ft/second at an angle of 45 degrees in the first quadrant.

For better stability, the underside of the belt rigid is supported by a smooth, flat, rigid surface [707]. The interface surface between the flat belt [703] and the support surface [707] is preferably reduced in friction by coating with a slippery substance such as teflon.

A tensioning mechanism is advantageously employed on one of the two rollers in the X direction and one of the rollers in the Y direction, preferably the idler roller, so that any slack or relaxation of the belts may be taken up.

Rollers may be arbitrarily small or arbitrarily large. However, sensible limits are placed on roller size by factors such as ease of assembly. In addition, the size of the hexagonal rollers is determined by the length of the roller and the hinge segment it defines. Obviously, there is an optimal roller size range for said assembly.

A hexagon shape has been arbitrarily chosen to depict the roller belt actuation means. The roller is not restricted to this shape, though it is reasonably expected that the roller will have between six and eight sides to optimize the balance between size and manufacturability.

Alternative Active Surface Mechanisms

The vector-slip principle may be employed with discrete components of another form as well.

Figure 9:
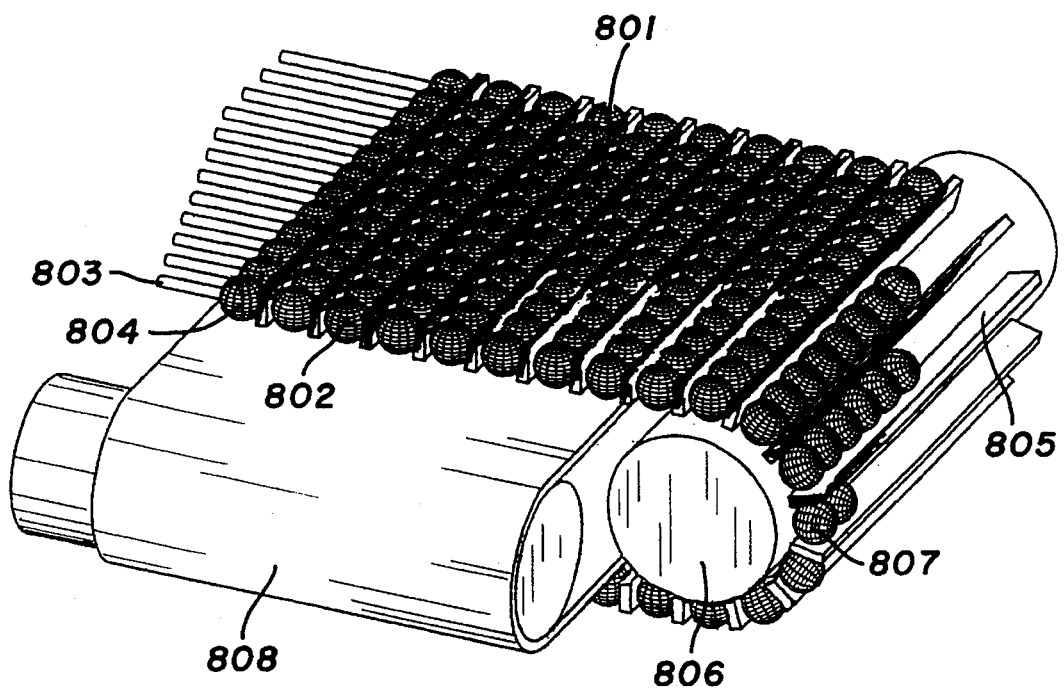
FIG. 9 is a perspective view of first modification of the track assembly useable with the treadmills of FIGS. 1 to 5.

In FIG. 9 is seen one corner of the active surface of the ODT [801], which consists of a multiplicity of identical beaded segments [802]. A beaded segment consists of a flexible cable [803] upon which is strung a number of beads [804]. The cable is fastened end to end to form a closed loop. Beads are separated by spacers [805]. Spacers serve two purposes. For one, they ensure a uniform bead spacing. Two, they impart linear force to the bead as the cable is pulled in either direction. Without the spacers attached to the cable, the cable would tend to pull through the beads rather then force them in the desired direction.

Rollers [806] (only one shown) support and direct the return loops [807] at the segment ends. Adjacent segments are fastened to each other by the spacer mechanisms [805]. The combination of adjacent bead segments and their associated spacers forms a uniform surface of beads, which is directly analogous to the uniform surface of the roller belt. As with the roller belt system, said beads are actuated in the ±X direction by one set of rollers, and are actuated in the ±Y direction by contact with a flat belt [808].

Figure 10:
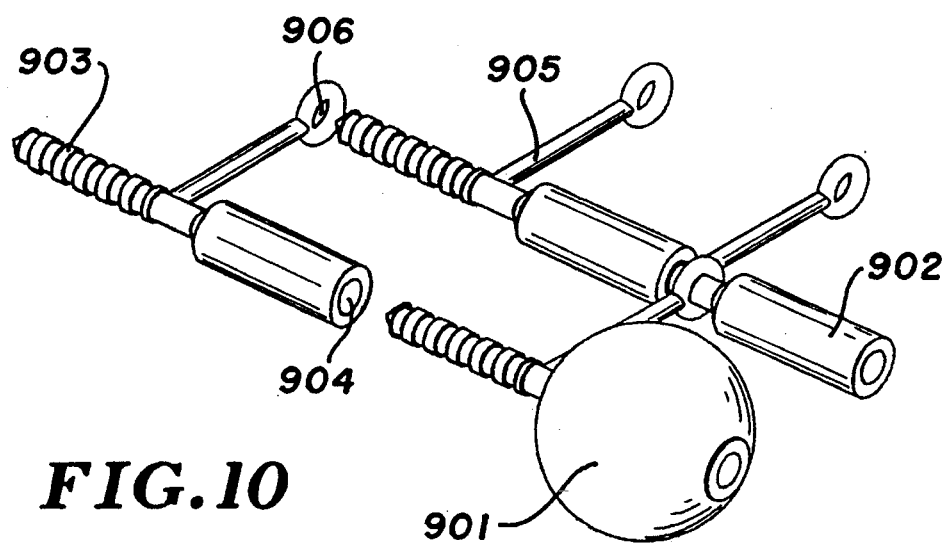
FIG. 10 is an exploded perspective view of a section of second modification of the track assembly useable with the treadmills of FIGS. 1 to 5.

Rather than stringing components on wire and fastening them together, it is also possible to fabricate a single, repeating construction unit which accomplishes the same function as the wire and bead assembly. FIG. 10 depicts such a repeating unit. A bead [901] (or roller) is rotatably mounted on a shaft [902] which has a male [903] and female [904] end as well as a connecting strut [905]. Beads are connected into closed-loop strings by fastening the male portion of the assembly into the female. Connections between strings of beads are made by mounting the hole of the strut [906] over the male portion of the adjacent string. It is understood that said repeating, componentized structures are also suitable for construction of a roller-type unit which duplicates the function of the above-described roller belt.

Following assembly of all the bead segments which comprise a roller belt, the assembly will look much as that depicted in FIG. 9, except the spacers [805] will be an integral part of each unit assembly [905] as separate connecting struts.

Figure 11:
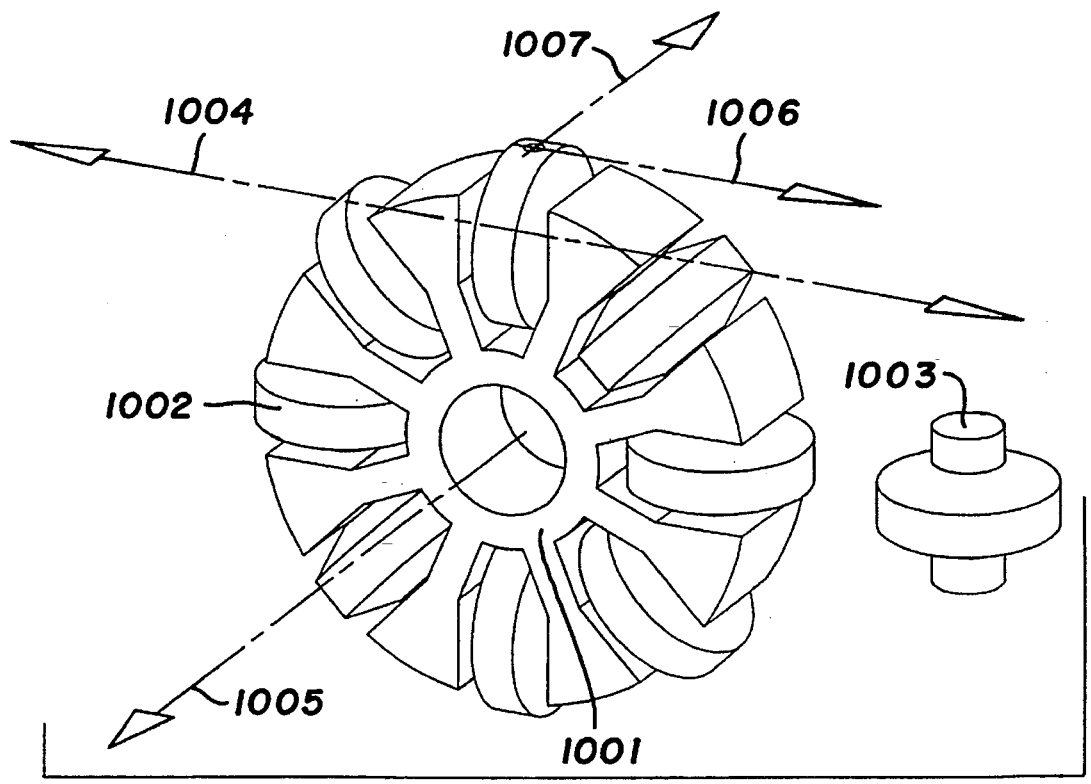
FIG. 11 is a perspective view of a modification of the omnidirectional wheel and idler rollers.

FIG. 11 reveals yet another omni-directional surface actuation means which uses a wheel [1001] with idler rollers [1002] positioned around its circumference. An idler roller unit [1003] is inserted into the appropriate receptor notch in the wheel [1001]. Each idler axis [1004] is oriented perpendicular to the powered axis [1005] of the wheel. Said vector-slip wheel has the unique property of being able to transmit force only through a line perpendicular to the powered axis [1006], the X axis. Any motion which the wheel sees in the Y axis passes over the idlers [1007].

Figure 12:
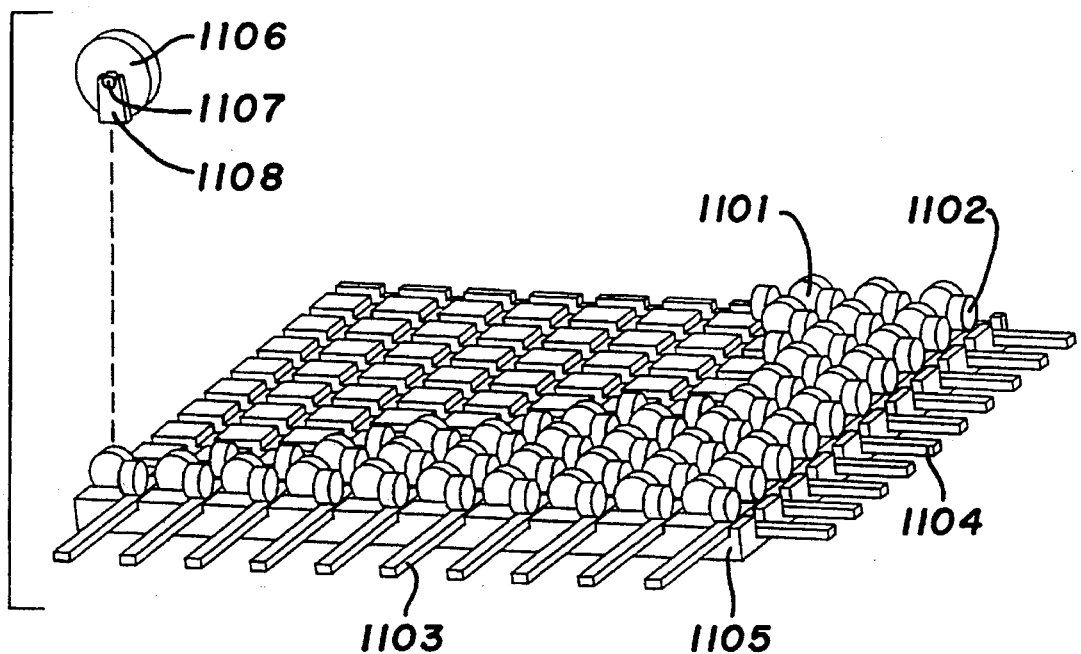
FIG. 12 is a perspective view of a third modification of the track assembly useable with the treadmills of FIG. 1 to 5.

FIG. 12 shows that by combining the above-described vector-slip wheel in an array of X oriented wheels [1101] and Y oriented wheels [1102], a combined direction vector may be achieved by selective actuation of the X and Y arrays. Said wheels are actuated in the Y direction by one set of belts [1103], and in the X direction by another set of belts [1104] which contact the bottoms of the wheels. These belts are held and directed by a base [1105] with guide grooves and mounts for the wheel arrays. Wheel [1106] is a typical X-direction wheel of the construction of FIG. 11. It is held onto the base by snap fitting its axis [1107]into snap grooves of a pair of mounting posts [1107], where only one post is shown. Every wheel is held onto the base in the same manner.

Because the X wheels are a larger diameter than the Y wheels, the contacting belts do not come into contact with one another. As with the beaded belt invention, actuation of the X wheel array actuates motion in the ±X direction which passes easily over the idlers of the Y vector-slip wheels with no hinderance. Pure Y motion is likewise unhindered by the X array. As long as a resting mass contacts a reasonable number of X and Y rollers, combining X and Y wheel arrays permits an active surface which is able to linearly actuate the resting mass in any direction through combination of the X and Y vectors.

Drive belts [1103, 1104] are continuous belts which are driven by rollers (not shown). The rollers are powered and controlled by motors in a fashion similar to the roller/motor combinations of FIGS. 1–4 & FIG. 7.

Ergotech, Inc. (5) makes an assortment of large rollers which employ shaped idler pulleys on their exterior which fall into the same class as the vector-slip wheel. Their use is as passive moving devices for boxes and other flat-bottomed articles.

Martin-Marietta (6) has employed a vector-slip drive on a lunar rover (7). Their idler rollers are oriented at 45 degrees to the main wheel drive axis. Thrust is therefore always at 45 degrees to the main wheel drive axis. By proper combination of the four thrust vectors available from the four wheels, the rover is able to navigate in any arbitrary planar direction.

One advantage of the method of discrete construction units is that their hinged nature allows better control of the active surface topography. By making the material of the flat belt flexible and deformable, and by supporting the underside of the flat belt with a multiplicity of individually controllable idler rollers, each support point may be selectively raised or lowered. By selectively raising or lowered idler support points on the flexible underside of the flat belt, and by jointedly connecting discrete construction units to form the beaded active surface, the active surface may be deformed with controllable bumps and depressions. Said bumps and depressions might be advantageously shown as matching bumps and depressions in the virtual environment, thus enhancing the reality of the immersive experience.

In a comparable fashion, the vector-slip wheels of FIGS. 11 & 12 may be individually raised and lowered to simulate a surface of varying texture. Since the vector-slip wheels are discrete units rather than tied in to a belt, they may be raised and lowered substantially more than their roller or bead counterparts. In this embodiment, because vector-slip wheels are potentially decoupled from their support surface, it is no longer possible to drive them using belts as shown in FIGS. 12. Each wheel must be individually actuated using separate drive means. While more complex, this arrangement is the only one of the aforementioned systems which permits simulation of complex tasks such as climbing stairs while retaining the advantage of an ODT.

Figure 13:
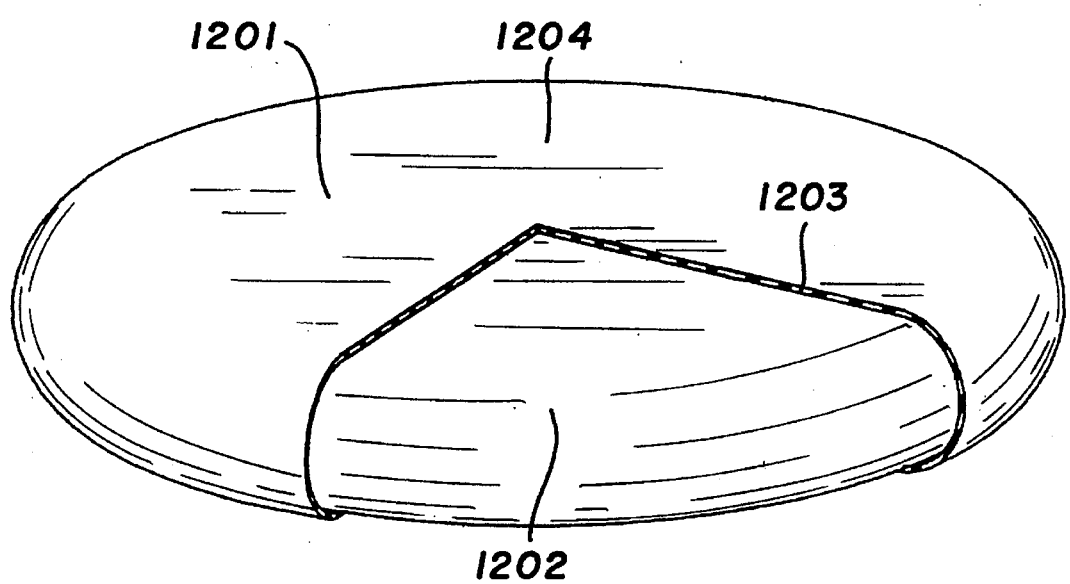
FIG. 13 is a perspective view partly sectioned of a spheroid treadmill segment.

FIG. 13 reveals yet another embodiment of an ODT which employs a moveable, continuous, active surface [1201] that wraps around a flattened spheroid [1202]. Said active surface is held onto the surface of the spheroid by its own elasticity, and the contact zone between the rigid spheroid and the moving surface [1203] is relatively frictionless. By sliding the active surface around the spheroid, the flat portion at the top of the spheroid [1204] will serve the same function as the active surface of earlier figures.

Figure 14:
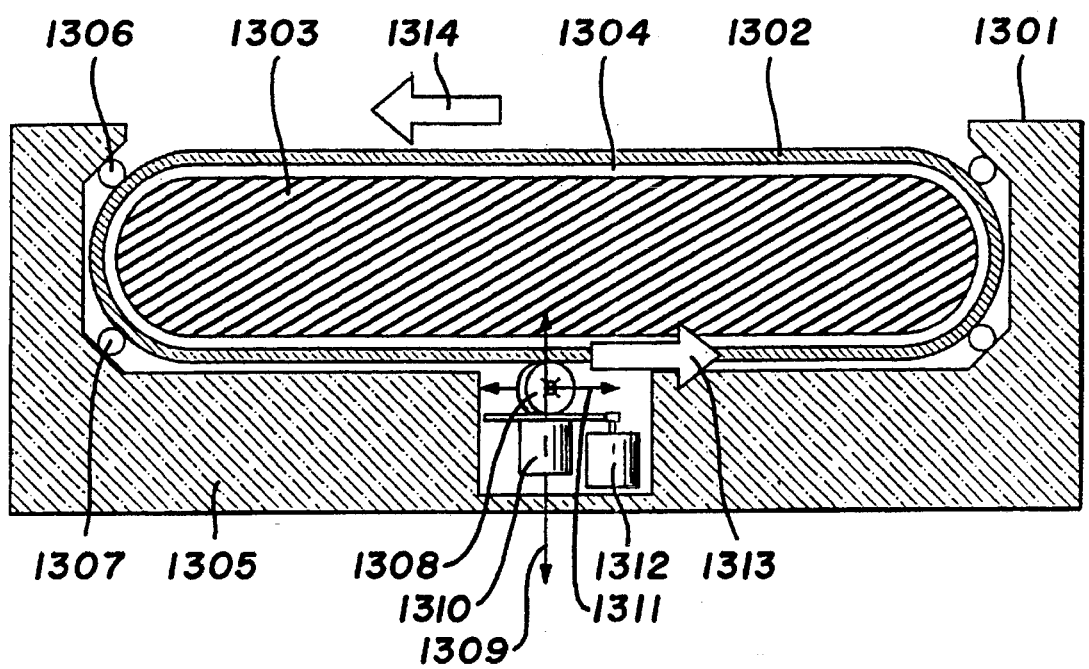
FIG. 14 is a sectional view of the segment of FIG. 13 incorporated in a track assembly.

FIG. 14 is a cross section of the fully implemented spheroid construction of FIG. 13 the ODT [1301] shows an active surface [1302] which stretchably surrounds the rigid spheroid [1303], separated by a relatively frictionless layer [1304]. The housing [1305] retains the active surface and spheroid by mounting passive casters which substantially retain the top [1306] and bottom [1307] contours of the fundamentally spheroid shape, and by presenting a slight overhang to retain motion of the assembly in the upward direction.

The active surface is controllably actuated by frictional contact with a steerable roller [1308]. Said roller is steerable about two axes. Axis one [1309] is powered by a motor [1310] about the roller itself, thus driving the bottom side of the active surface by frictional contact. Axis two [1311] driven by motor [1312] provides steerability of the roller so that the roller can direct its thrust vector in a full circle. A thrust vector provided by the roller causes the active surface to slide around the spheroid. As depicted, with the roller providing thrust on the lower surface substantially in the +X [1313] direction, the upper surface responds in the −X [1314] direction.

Figure 15:
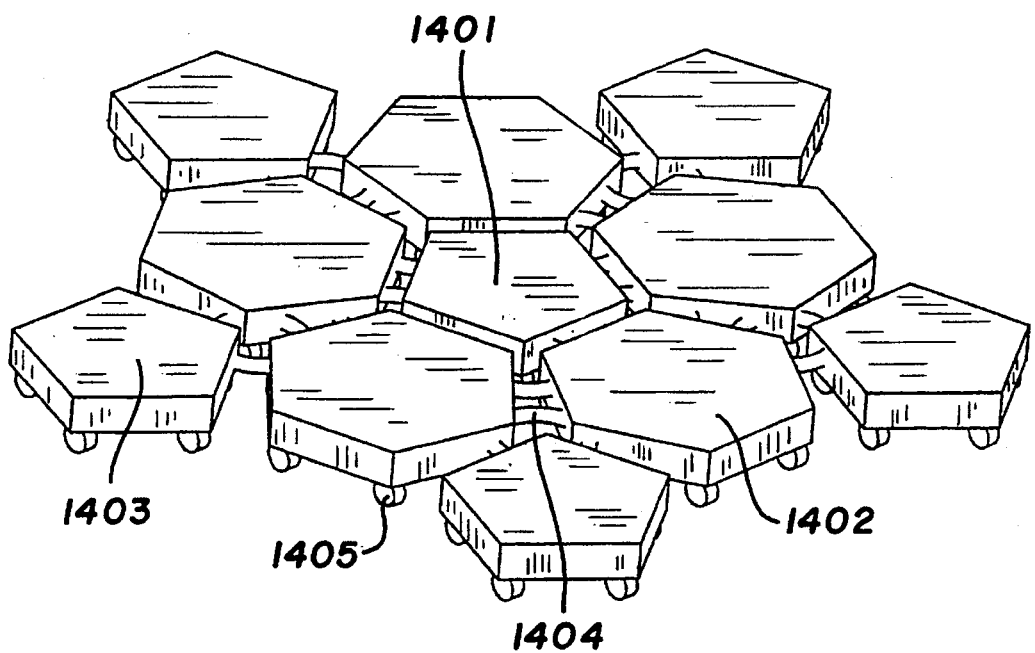
FIG. 15 is a perspective view of another modification of the active surface of the track assembly.

FIG. 15 details one potential embodiment of a small area of the active surface [1401]. A pattern of rigid plates is arranged to form an array of hexagons [1402] and pentagons [1403], much like the surface of a soccer ball. Corners of the plates are held together elastically [1404], so that the surface may expand and contract appropriately as it traverses the spheroid. The underside of each plate is suitably supported by an arrangement of casters [1405] which are pressed into the rigid material of the plate. Said casters permit contact between the plate and the spheroid to be low in friction, as required for proper function.

An improvement on the embodiment of the powered roller [1308] of FIG. 14 would be to split the roller function into two rollers actuated by a differential gear unit. It may then still be powered by two motors as revealed above, however it would gain the advantage of minimizing rotational friction during steering, much the same way an automobile differential permits the drive wheels of a turning car to rotate at their own speed.

It is understood that the surface construction of FIG. 15 is exemplary, and represents only one of a class of surface constructions which fulfills the function of a flexible, low-friction active surface interacting with a contained, flattened, spheroid.

Advanced System Configurations

Although the basic system configuration includes a support cuff for assistance of balance and optionally for tracking user orientation, it also has the potential to completely lift and support the user. A strengthened and fully actuated support strut connected to a fully supporting cuff and harness enables a user to be lifted up from the active surface and moved within the confines of the mechanically limited motion envelope. A system of this type would allow a user to transition between active surface locomotion and free-body flight.

In a similar fashion, the entire active surface and related mechanism may be mounted upon a motion platform which permits various combinations of linear and angular motions of the surface. A tipped surface is useful for simulating an inclined surface in virtual space, like a user might encounter when walking up a virtual hill. A surface which moves up and down as well as angularly can simulate the deck of a ship, or the cabin aisle of an aircraft.

Figure 16:
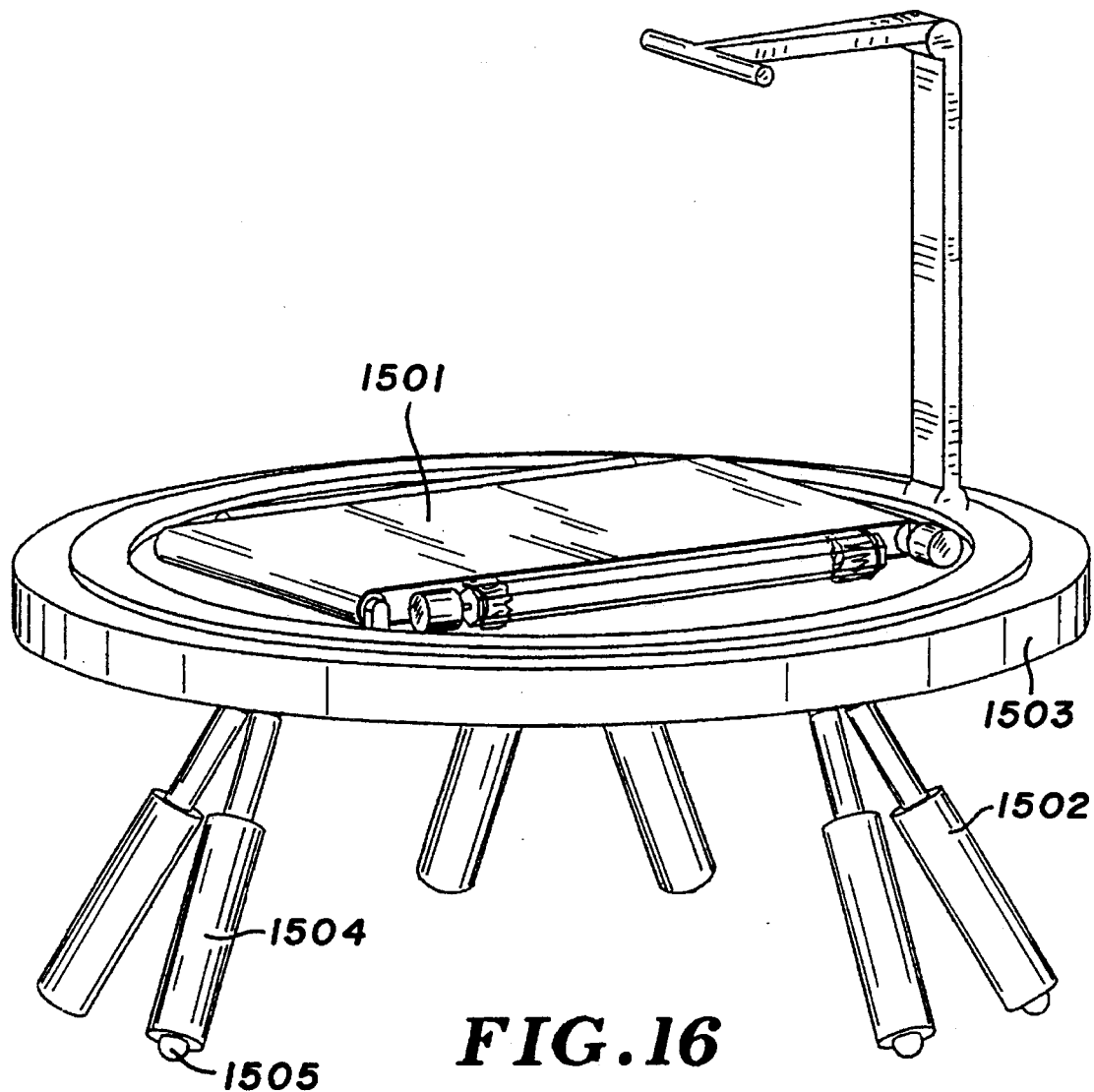
FIG. 16 is a perspective view of FIG. 4 combined with a hexapod motion platform.

FIG. 16 depicts the combination of the simplified ODT of FIG. 4 with a standard 6 degree-of-freedom hexapod motion platform [1502]. The base of the ODT [1503] serves as the attachment point for the six linear actuators [1504] which comprise the hexapod. Control of said cylinders provides full 6 DOF motion, and the control of said hexapod structure is well known to those skilled in the art of motion control. Cylinders are attached by ball joints to ground [1505], and by ball joints to the base [1503]. Said cylinders may typically be actuated by hydraulics, pneumatics, or by a ball screw mechanism. The power and control means for the hexapod and ODT are omitted from the figure, but are understood to include a power conditioning means, a position sensing means, a control computer, and a control loop of the type described in FIG. 2. It is also understood that the ODT which attaches to the hexapod might just as easily be of the construction of FIGS. 1, 3, 5, 9, 10, 12, 13 or 14.

Combining the ODT with an enclosed simulator such as the spherical motion environment developed by Virtual Space Devices, Inc. would permit not only 3 to 6 DOF to be applied to the active surface of the ODT, but would also allow transitioning between walking, free-body flight, and vehicular simulation.

An ODT need not be the main interface device for an immersive system. It might, for example, be complimentary to a vehicle simulator. A standard simulator for a vehicle such as a jeep, mounted on a hexapod motion platform, could be placed adjacent to an ODT. As the user emerges from the vehicle simulator, the ODT would be positioned at virtual ground so that the user experiences a smooth transition between vehicular transport and ground motion.

Figure 17:
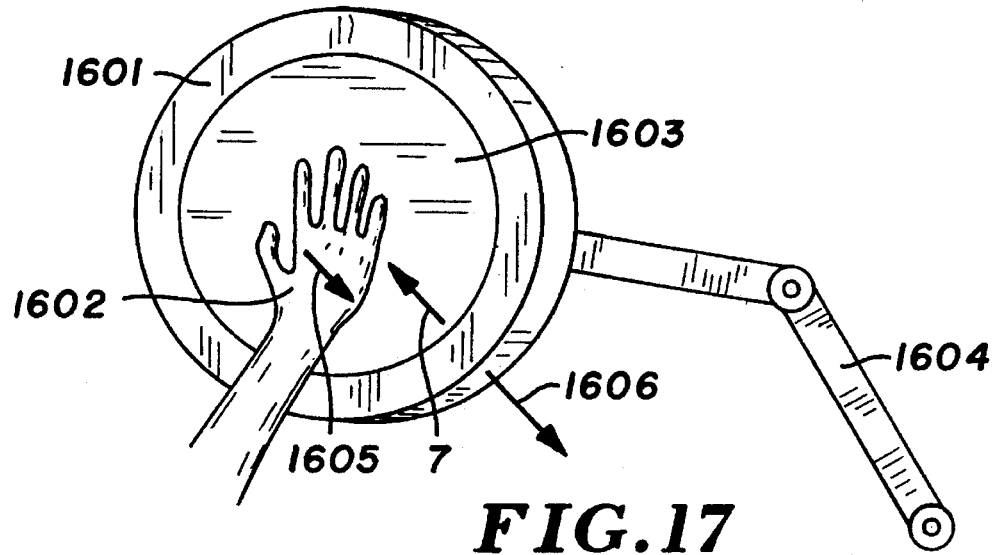
FIG. 17 is a perspective view of an active surface haptic display.

The unique, omni-directional qualities of an active surface such as those revealed herein may be employed in yet another way. As a haptic display device, an active surface is able to convey a sense of friction to a user as they run their hand along a surface. FIG. 17 presents an embodiment for a active-surface haptic display [1601]. As the user's hand [1602] reaches out to contact a virtual object, the active surface [1603], which is only slightly larger than the major diameter of the user's palm print, is placed by a robotic mechanism [1604] where the user expects that surface to be. As the user moves their hand along the surface in one vector direction [1605], the haptic display mirrors the motion of the hand [1606], while the active surface creates an equal and opposite counter vector [1607] by moving its surface counter to the motion of the hand. The user resultingly feels the friction of the virtual solid's surface as the hand is rubbed across the moving surface. Because of the omni-directional nature of the active surface, the hand may trace an arbitrary path.

In its basic form, the active surface is flat both because the support surface behind the activation means is most easily fabricated as a flat surface, and because the interlinked nature of the active means tends to prevent creation of surface contour. A flat surface will be effective for simulating a flat virtual solid, but it can only approximate a curved solid. A moderate amount of curvature may be achieved, however, by bowing the support surface upward. In the case of haptic display using an active surface, bowing might be accomplished using pressurized air behind a thin and flexible support surface. The amount of bowing may be controlled to correspond to the average curvature at the user's contact point with the virtual solid.

Description of the preferred embodiment as including an HMD, gloves, body suit, etc. does not exclude other applicable system configurations. There are a number of additional display options which may advantageously employ an ODT. For example, Myron Krueger's original display method (8) employs large display screens which surround the user. Spherical display surfaces have been employed for a number of,years by various companies such as IMAX theater (9), or Evans & Sutherland (10). Most recently Evans & Sutherland, Inc. revealed a spherical viewing structure which essentially surrounds the user to provide a nearly fully spherical viewing surface. A projected image tracks the user's viewing cone and displays the appropriate scene. An advanced display method being developed by the Human Interface Technology Lab (11) places light directly on the retina of the eye using a weak laser beam. Any of these display systems and their related interfaces can benefit by use of the ODT.

Telepresence

Discussion of a VR system would not be complete without mention of telepresence. While VR systems substantially synthesize the user's sensory experience, telepresence systems extract their sensory information from a real, remote source and convey it to the senses of the user. In the simplest example, a pair of video cameras might be mounted on a 3 degree-of-freedom platform whose motion is slaved to the user's head. An HMD on the user's head receives the stereo images from the paired video cameras thus creating the visual illusion that the user's head is sitting on the platform instead of the two cameras! A system is this type which also includes sound is commercially available from Telepresence Research, Inc.

With regards to the ODT, it is feasible to couple the walking motion of the user to the lateral movement of a remote sensing device. Using natural walking and turning motion to steer and guide a remote device has the advantage of freeing both hands to perform other tasks rather than being restricted to a steering device like a joystick. A coupling of the telepresent remote with the user would likely include, besides the ODT, a video and sound link. Other system configurations might include one or two hand operated actuators which the operator uses to preform manipulation tasks at the remote site.

Figure 18B:
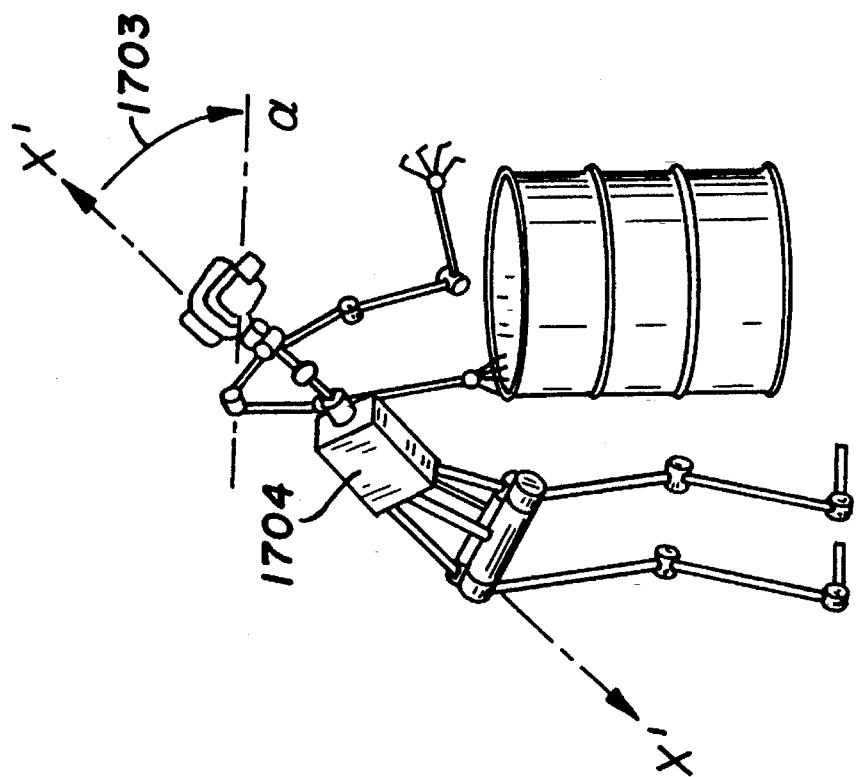
FIGS. 18a and 18b are diagrammatic views showing the user at one site to control a remote at a distal site.
Figure 18A:
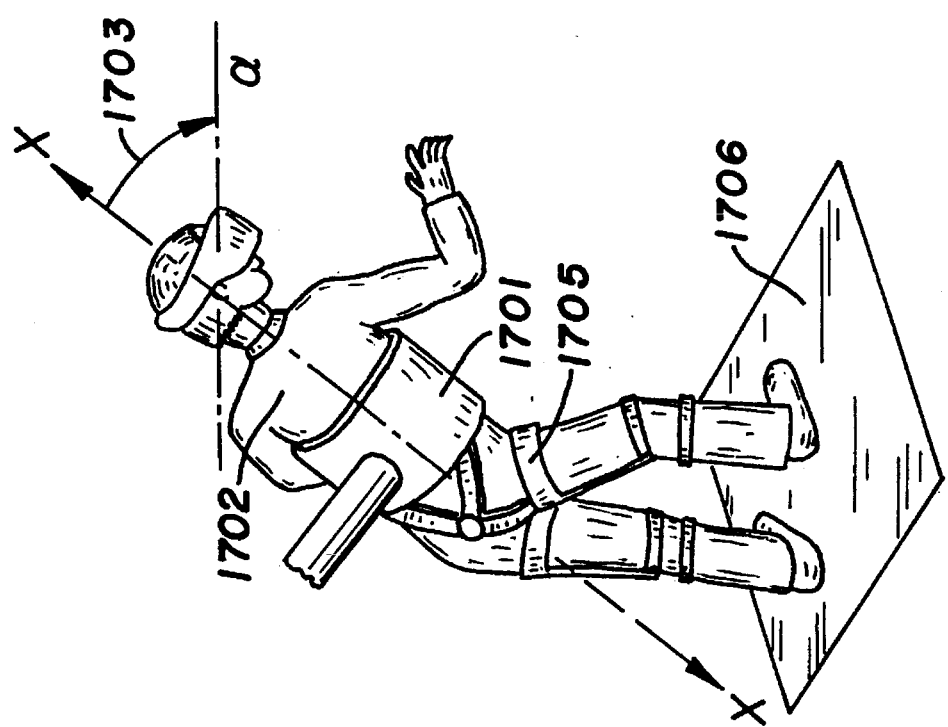

FIGS. 17a and 17b show a system in which a user at one site, FIG. 18a, controls the remote at a distal site, FIG. 18b. This advanced form of ODT and telepresent coupling would employ not only the above-mentioned systems, but also a means of conveying the remote's physical orientation. This is accomplished by using the balance cuff [1701] to force the user [1702] into the orientation [1703] of the remote [1704]. Feedback on the cuff by the user, in turn, also forces the remote into the orientation of the user. By combining this orientational interplay with a bipedal remote and an exoskeletal structure [1705] which links the remote's legs to the user's legs, it is possible for the remote to balance itself in both standing and walking modes. Combination of the above structures to enable locomotion of the remote is made possible because the user is standing on an ODT active surface [1706] which permits the user to employ their natural balance abilities as they navigate using the electronic eyes of the remote.

I claim:

1. An apparatus for allowing a user to walk or run in any arbitrary direction comprising: a frame, a track assembly mounted on the frame, said track assembly having a user active surface means for supporting the user walking or running thereon, wherein said user active surface means having a first user support means moveable in a first direction for supporting the user and a second user support means movable in a second direction, said first user support means having a plurality of user support members rotatable about axes generally parallel to the first direction first drive means connected to the user support members to move said user support members in the first direction, and second drive means cooperating with said second user support means to rotate said second user support means in the second direction, whereby the combined movements of the user support members and rotation of the second user support means results in omni-directional user movement, and control means responsive to directional orientation of the user on the user active surface means to selectively control the operation of the first and second drive means, thereby control the directional user movement to conform with the orientation of the user on the user active surface means.

2. The apparatus of claim 1, wherein the user support members are cylindrical members, at least one cylindrical member being connected to the first drive means to rotate the one cylindrical member, and said first user support means further comprises endless means trained about said cylindrical members and moveable by the one cylindrical member in said first direction, said endless means having rod means for rotatably supporting the user support members for rotation about axes generally parallel to the first direction of movement of the first user support means.

3. The apparatus of claim 2, wherein the second user support means comprises a pair of rollers and an endless belt trained about said rollers, said second drive means being connected to at one of the rollers to move the endless belt, said endless belt having a top surface operably engageable with the user support members to rotate said user support members.

4. The apparatus of claim 3, wherein said second user support means further comprises a support surface, and wherein said endless belt has an upper run having said top surface, and said support surface located below said upper run for holding the upper run in contiguous relationship relative to the user support members.

5. The apparatus of claim 1, wherein the first user support means further includes rods, and wherein the user support members are cylindrical sleeves rotatably mounted on the rods.

6. The apparatus of claim 1, wherein the first user support means further includes a plurality of longitudinal rods, and wherein the user support members are spherical members rotatably mounted on the rods for rotation about the longitudinal axes of the rods.

7. The apparatus of claim 1, wherein the control means includes a closed loop position control to maintain position of the user toward the center of the user active surface means in response to user traversal of the user active surface means.

8. The apparatus of claim 1, wherein the control means includes adapting means adapted to be coupled with the user to actively track the motion of the user and to assist the user in maintaining the balance.

9. The apparatus of claim 8, wherein the adapting means adapted to be coupled with the user includes a cuff connectable to the user.

10. The apparatus of claim 8, wherein the adapting means adapted to be coupled with the user includes handle means adapted to be grasped by the user to assist the user in maintaining the balance.

11. The apparatus of claim 1, wherein said control means includes virtual reality means responsive to directional orientation of the user on the user active surface means to provide the virtual reality response corresponding to the direction of the movement of the user on the user active surface means, said virtual reality means includes a head-mounted visual display for displaying visual images, a display control means for projection of said visual images, speaker means for generating sounds, a microphone for the user, means for sensing the position of the user on the user active surface means and means for connecting the head-mounted visual display, display control means and speaker means for generating images and sounds.

12. The apparatus of claim 11, wherein said virtual reality means further includes interactive solids for providing the user with haptic feedback.

13. An omni-directional treadmill for allowing a user to walk or run in any arbitrary direction comprising: a frame, a track assembly mounted on the frame, said track assembly having a user active surface means for supporting the user walking or running thereon, wherein said user active surface means having a first user support means moveable in a first direction for supporting the user and a second user support means movable in a second direction, said first user support means including a plurality of user support members rotatable about axes generally parallel to the first direction, first drive means connected to the user support members to move said user support members in the first direction, and second drive means cooperating with said second user support means to rotate said second user support means in the second direction, whereby the combined movements of the user support members and rotation of the second user support means results in omni-directional movement of the user on the user active surface means in a second direction, and control means including virtual reality means responsive to directional orientation of the user on the user active surface means to selectively control the operation of the first and second drive means and to provide the virtual reality response corresponding to the direction of the movement of the user on the user active surface means, thereby control the directional user movement to conform with the orientation of the user on the user active surface means.

14. The treadmill of claim 13, wherein the user support members are a pair of cylindrical members, at least one cylindrical member being connected to the first drive means to rotate the one cylindrical member, and said first user support means further comprises endless means trained about said cylindrical members and moveable by the one cylindrical member in said first direction, said endless means having rod means for rotatably supporting the user support members for rotation about axes generally parallel to the first direction of movement of the first user support means.

15. The treadmill of claim 14, wherein the second user support means comprises a pair of rollers and an endless belt trained about said rollers, said second drive means being connected to at least one of the rollers to move the endless belt, said endless belt having a top surface operably engageable with the user support members to rotate said user support members.

16. The treadmill of claim 15, wherein said second user support means further comprises a support surface, and wherein said endless belt has an upper run having said top surface, and said support surface located below said upper run for holding the upper run in contiguous relationship relative to the user support members.

17. The treadmill of claim 13, wherein the first user support means further includes rods, and wherein the user support members are cylindrical sleeves rotatably mounted on the rods.

18. The treadmill of claim 13, wherein the first user support means further includes a plurality of longitudinal rods, and wherein the user support members are spherical members rotatably mounted on the rods for rotation about the longitudinal axes of the rods.

19. The treadmill of claim 13, wherein said virtual reality means includes a head-mounted visual display for displaying visual images, a display control means for projection of said visual images, speaker means for generating sounds, a microphone for the user, means for sensing the position of the user on the user active surface means and means for connecting the head-mounted visual display, display control means and speaker means for generating images and sounds.

20. The treadmill of claim 19, wherein said virtual reality means further includes interactive solids for providing the user with haptic feedback.

* * * * *